INVENTOR.
Robert D. Kern,
BY Morsell + Morsell
ATTORNEYS.

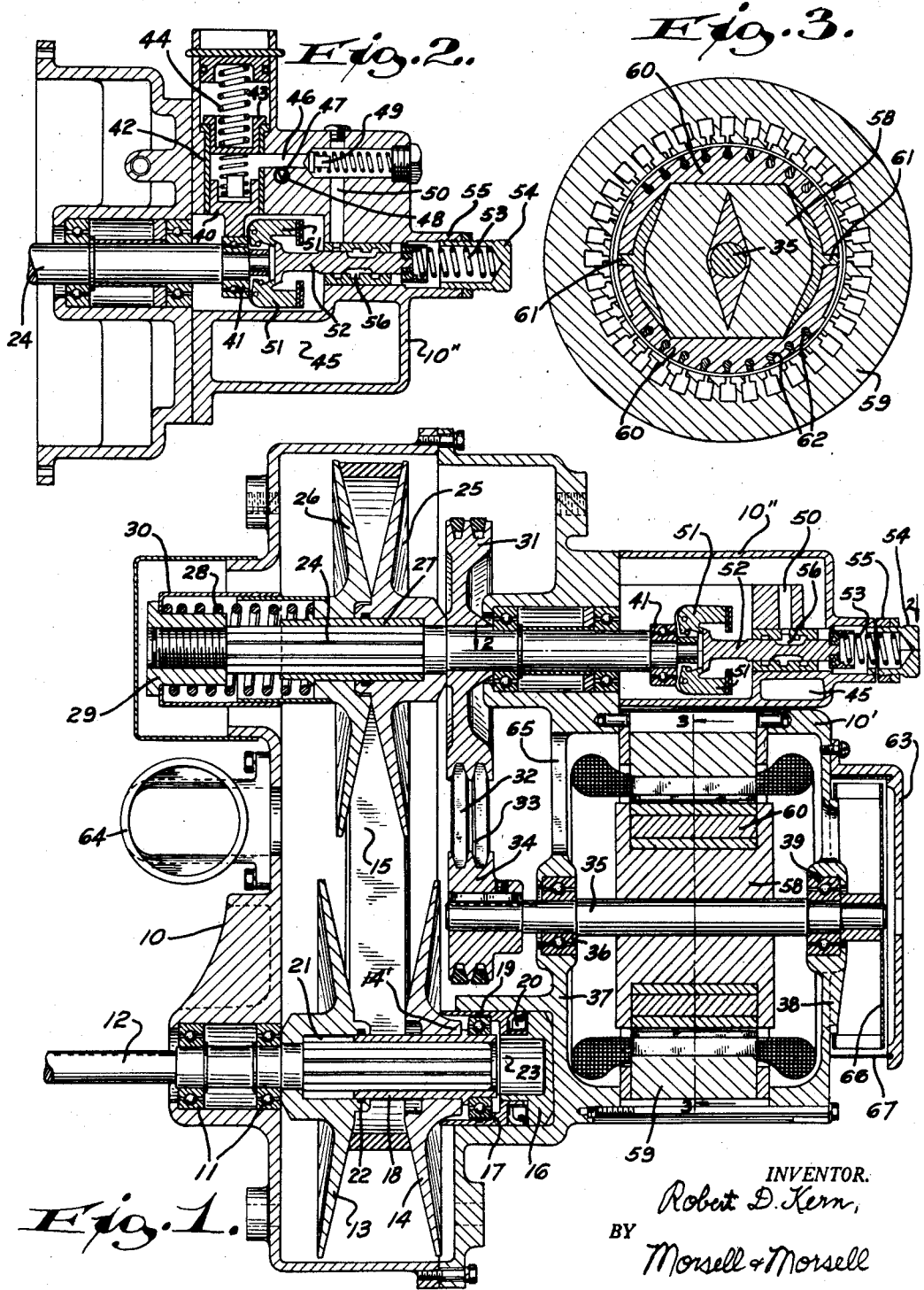

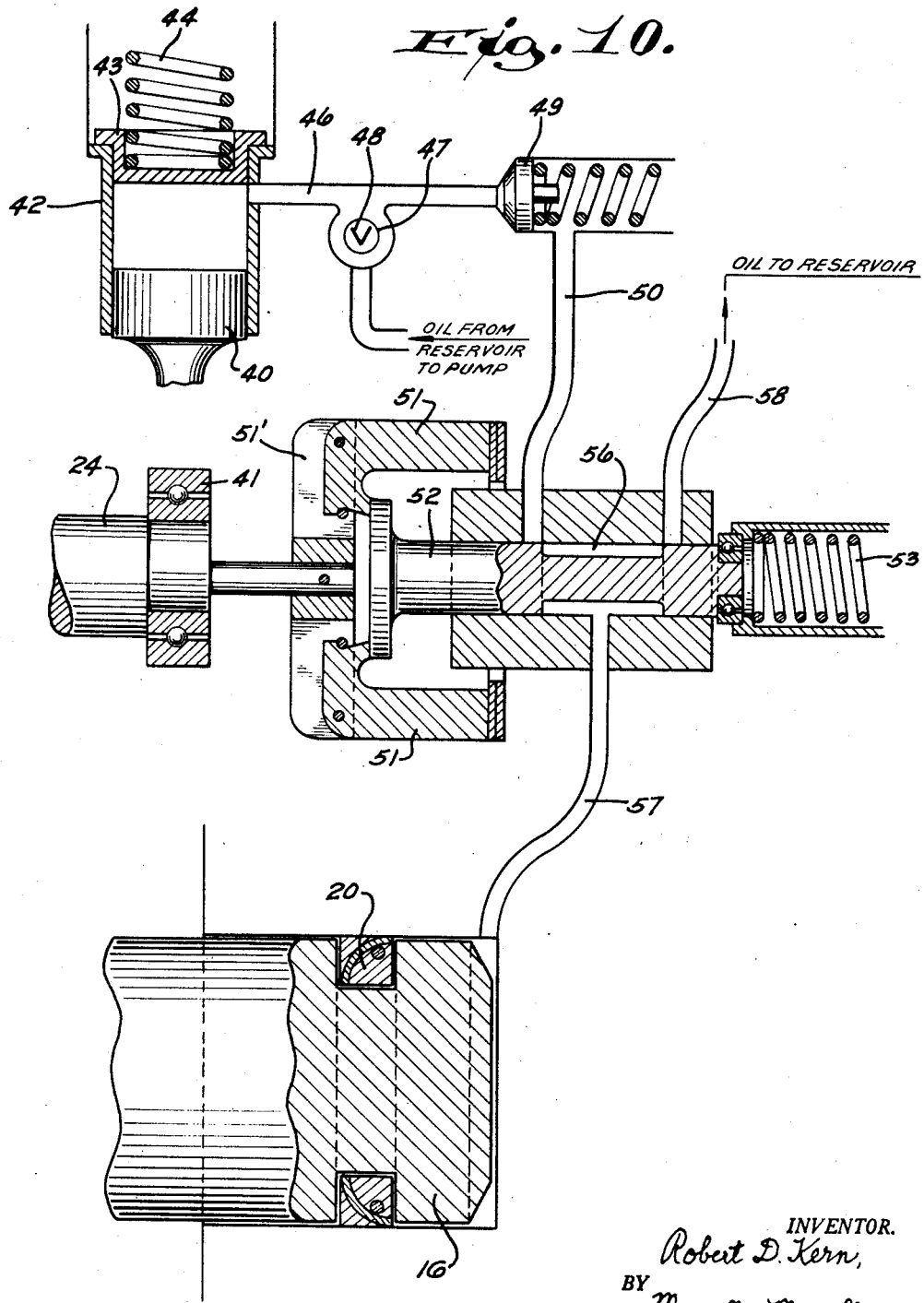

United States Patent Office 2,891,213
Patented June 16, 1959

2,891,213

CONSTANT FREQUENCY VARIABLE INPUT SPEED ALTERNATOR APPARATUSES

Robert D. Kern, Waukesha, Wis., assignor to Electric Control Corporation, Wales, Wis., a corporation of Wisconsin Application October 30, 1956, Serial No. 619,237

10 Claims. (Cl. 322—42)

This invention relates to improvements in constant frequency variable input speed alternator apparatuses.

A general object of the invention is to provide an alternator assemblage of compact form which will supply to various electrical appliances a constant voltage and frequency alternating current output when driven from a power source of either constant or variable speed.

Motor trucks, power boats and various types of motor-operated vehicles and conveyances, as well as installations having a prime mover, frequently have installed therein electrical appliances of various types to be operated by electricity derived from a generator or alternator driven by the prime mover of the vehicle, conveyance, or installation. In trucks, motorboats, power-operated vehicles and the like the motor may run at idling speeds or at various operating speeds and this creates a problem in connection with the derivation of a constant output voltage and frequency alternating current to properly run the electrical equipment or appliances in the conveyances or installations. The present invention provides, however, an alternator assemblage adapted to be driven by the prime mover of the vehicle or the like and which will supply a constant voltage and frequency alternating current output within the practical range of speed of operation of the motor of the vehicle or the like.

A further object of the invention is to provide an alternator apparatus which includes a compactly associated hydraulic governor unit, a servo control unit or pump and a variable speed drive belt and sheave assembly, all within a relatively small unitary casing for convenient mounting within a motor-operated vehicle or conveyance.

A more specific object of the invention is to provide, in an alternator assemblage, a variable speed drive belt and sheave unit including a driver sheave and a driven sheave, both of which have one movable sheave plate or side which will produce a variable pitch relative to the belt engaged thereby.

A further, more specific object of the invention is to provide, in an alternator assemblage, a governor unit which includes an hydraulic pump and a governor control member, the hydraulic pump being arranged to supply oil at constant pressure with a variable displacement which automatically varies with the demand on the governor system.

A further more specific object of the invention is to provide, in an alternator assemblage, an hydraulic governor servo control unit which is connected with the variable speed drive belt and sheave assemblage and automatically and continuously adjusts the variable speed drive belt ratio to compensate for all practical changes in the input shaft speed.

A further more specific object of the invention is to provide, in an alternator assemblage, a rotating field alternator which is devoid of brushes and other electrical elements which might deteriorate under the influence of sea water or other adverse elements or conditions.

A further object of the invention is to provide a constant frequency variable input speed alternator apparatus which is convenient to install, which is efficient and automatic in its operation, which is durable and protected against deterioration, and which is well adapted for the purposes described.

In the accompanying drawings, in which the same reference characters indicate the same parts in all of the views:

Fig. 1 is a vertical sectional view of the improved alternator apparatus;

Fig. 2 is a fragmentary sectional view taken along the line 2—2 of Fig. 1;

Fig. 3 is a sectional view of the alternator taken along the line 3—3 of Fig. 1 with the stator windings omitted;

Fig. 10 is a semi-schematic view of the assemblage showing the hydraulic system.

Figure 4:
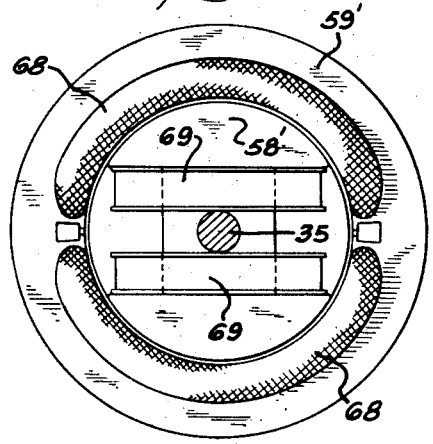
Fig. 4 is a front view illustrating a modified form of alternator unit.

The improved constant frequency variable input speed alternator apparatus is adapted to be mounted in a motor operated truck, power boat, or other installation or assemblage wherein the prime mover, during its operation, idles or runs at various speeds.

The improved alternator apparatus is designed to supply from the operating motor of the vehicle, conveyance or installation a constant voltage and frequency alternating current to operate standard electrical equipment within the vehicle or installation such as refrigerating plants, various types of electrical equipment, tools or the like. Essentially, the assemblage comprises a rotating field alternator, a variable speed drive belt and sheave assembly, and an hydraulic governor servo control unit. All of these units are operatively associated and are housed within a unitary casing or housing so as to form a compact assemblage which can be conveniently mounted in a desired position within the motor driven vehicle or the like. The variable speed drive belt and sheave assembly will first be described.

Referring now more particularly to Fig. 1 of the drawings it will appear that the main casing or housing is designated by the numeral 10 and a lower sidewall portion thereof houses bearings 11 which revolubly engage a portion of an input shaft 12 which extends to and is driven by the prime mover (not shown) of the truck, motorboat or other form of motor driven vehicle, conveyance or other installation having a prime mover and which is equipped with the improved constant frequency variable input speed alternator apparatus.

A driver sheave is mounted on a portion of the input shaft 12 within the casing 10 and comprises a fixed sheave plate 13 mounted to turn with the shaft 12 and an axially movable cooperating driver sheave plate 14 splined on the inner portion of the shaft 12 so as to move toward or away from the complementary fixed sheave plate 13 to vary the pitch diameter of the driver sheave. The sheave thus formed is engaged by an endless belt 15 which extends to and engages a driven sheave which will be described hereinafter.

Within the right hand end of the main casing portion 10, relative to Fig. 1, there is operatively mounted an hydraulic piston 16 which reacts against a thrust bearing 17 to transmit pressure toward the left, relative to Fig. 1, through the sleeve 18 to which the sheave plate 14 is affixed, whereby the sheave plate 14 may be moved on the splined portion of the shaft 12 toward the fixed sheave plate 13. The thrust bearing 17 is floatingly mounted between the hub 14′ of the movable sheave plate 14 and the piston 16 by means of an O-ring 19 which compensates for changes in radial clearances which might occur because of wear on the shaft 12. Within the piston 16 is an oil seal 20 to prevent the passage of hydraulic fluid. The hub 14′ of the movable sheave plate 14 of the driver sheave and the sleeve 18 to which it is affixed move axially of the shaft 12 within a cup-shaped recess 21 in the hub of the fixed sheave plate 13 and are engaged by an O-ring 22 to prevent the seepage of oil axially of the shaft chamber. The splined portion of the shaft 12 runs in a bath of oil, the oil chamber including the recessed portion 23 within the piston 16. The construction described prevents any leakage of oil axially of the shaft 12 or outwardly of the oil chamber.

Journalled within the housing portion 10 above or laterally of the driver sheave is a splined, idler shaft 24 which carries a driven sheave engaged by the belt 15. The driven sheave includes a fixed sheave plate 25 fast on a portion of the shaft 24 cooperating with an axially movable sheave plate 26 whose hub portion is affixed to a sleeve 27 which engages the splines of the shaft 24 so that the movable sheave plate 26 may move toward or away from the fixed sheave plate 25 to vary the pitch diameter of the driven sheave. The axial movement of the movable sheave plate 26 of the driven sheave is against the resistance of a coiled spring 28 whose tension can be adjusted by a cap 29 in threaded engagement with the outer threaded end portion of the shaft 24. The flanged outer end of a telescopic housing 30 engages the cap 29 and the end portion of the other section of the housing 30 is carried by the hub portion of the sheave 26. Said telescopic housing 30 encloses the spring 28 and provides an oil reservoir for lubrication of the splined shaft 24.

Fast on an intermediate portion of the splined shaft 24 adjacent the hub of the fixed sheave plate 25 of the driven sheave is a double sheave 31 engaged by endless belts 32 and 33 which also engage the grooved portions of a double sheave 34 therebelow which is fast on one end portion of an intermediate shaft 35 which is journalled in a bearing 36 in an intermediate partition 37 in the main housing 10. Said belts 32 and 33 may be engaged by an idler pulley and conventional belt tightener (not shown), if desired. It will be obvious that the intermediate shaft 35 is driven through the driven input shaft 12 which carries the driver sheave which, in turn, through the belt 15 and driven sheave, drives the idler spline shaft 24. The latter, through the sheaves 31 and 34 and the two belts 32 and 33, drives the intermediate shaft 35.

The governor assembly includes an hydraulic pump and a governor control unit and is housed within a housing extension 10″ at the upper right hand corner of Fig. 1 and into this housing extension the idler shaft 24 extends. The hydraulic pump is of the type which will supply oil or hydraulic fluid at a constant pressure with a variable displacement. The displacement or volume automatically varies with the demand of the governor. A pump piston 40 (see Fig. 2) engages and is reciprocated by an eccentric ballbearing 41 fast on a portion of the idler shaft 24. The turning of the eccentric ballbearing 41 furnishes sufficient stroke to supply the volume of oil required for the control system. The driven idler shaft 24 operating at a constant speed will allow the pump piston 40 to displace a constant volume of oil per unit of time. Within the cylinder 42 for the pump there is a spring-loaded head 43 and the tension of the confined coil spring 44 acting thereagainst is set to hold the pump head 43 stationary up to a predetermined pressure. If the pressure exceeds this predetermined limit the pump head 43 will move in the same direction as the piston 40, thereby limiting the displacement while holding the pressure constant. The numeral 45 designates an oil supply reservoir or sump and oil is supplied therefrom to a passageway 46 communicating with the pump cylinder by a pump inlet conduit 47 controlled by a check valve 48. The outlet end of the pump cylinder supply chamber 46 is controlled by a spring urged check valve 49. The exhausted oil from the oil pump, following escape through the outlet check valve 49 enters a conduit 50 for passage to the chamber in which the piston 16 operates for moving the sheave plate 14 of the driver sheave. The complete hydraulic system which is shown schematically in Fig. 10 will be described in detail hereinafter. At this time it may be stated that the pump and hydraulic system is such that power will be drawn from the idler shaft 24 only when the governor control unit (later to be described) creates a demand for oil volume. The particular pump construction is such that horsepower requirements are greatly reduced as compared with conventional hydraulic pumps.

Also within the portion of the casing which houses the pump and a continuation of the idler shaft 24 is a governor unit which is of the flyball hydraulic type. The governor weights 51 are pivotally associated with a portion of the idler shaft through a carrier 51′ (see Fig. 10) and have shouldered portions which react against the end of an axially movable hydraulic valve armature 52. The outer end portion of the hydraulic valve armature 52 is engaged by a confined coiled spring 53 whose tension can be adjusted by a threaded cap 54 which encloses the spring and which is received by a tubular extension 55 on the casing. The tension exerted by the spring 53 is set for the desired control speed. If the speed of rotation of the idler shaft 24, from which the pump piston 40 is driven, exceeds the control speed, the centrifugal force exerted by the governor weights 51 will exceed the tension for which the spring 53 was set. This will then cause the control valve armature 52 to move toward the right relative to Figs. 1 and 2, in which position the ported portion 56 of the valve armature will provide communication between a conduit 57 (see Fig. 10) supplying the cylinder for the variable sheave piston 16 and a return conduit 58 to the reservoir 45. With this reduction of pressure against the piston 16 which controls the movable sheave plate 14 of the driver sheave, the mean belt diameter of the variable driver sheave will be decreased and there will be a corresponding increase in the mean belt diameter of the variable driven sheave formed by the sheave plates 25 and 26. This condition results in a drop in the speed of rotation of the idler shaft 24 and causes it to approach the desired control speed. When the desired control speed is reached the fly weights 51 on the governor unit again reach a state of balance with respect to the governor spring 53 at its intermediate position. Consequently the position of the valve armature 52 will then be such that the port or conduit 57 supplying oil under pressure to the sheave control piston 16 will be closed, trapping oil in the sheave piston cylinder and causing the drive to maintain the pulley ratio last established.

Should the speed of the idler shaft 24 drop below the desired control speed the balance of forces is then upset and the centrifugal position of the governor weights 51 will then be such as to allow the valve armature 52 to be forced by the spring 53 to its innermost position to the left relative to Figs. 1, 2 and 10. Thereupon the ported portion 56 of the valve armature 52 will provide a connection between the conduit 50 which exhausts oil from the pump cylinder and the conduit 57 which supplies oil under pressure to the cylinder for the sheave control piston 16. Full pump pressure is then applied directly against the piston 16 for the variable driver sheave and the pump will supply sufficient hydraulic fluid to move the sheave plate 14 toward the fixed sheave plate 13 so as to increase its mean belt diameter. Correspondingly, the mean belt diameter of the driven sheave formed by sheave plates 25 and 26 will be reduced and readjust the sheave ratio in a manner to bring the speed of operation of the idler shaft 24 back to the predetermined control speed. It will thus appear that the control thereby attained is completely automatic and there will be a continuous adjustment of the variable speed drive belt ratio to compensate for all practical operational changes in the speed of rotation of the input shaft 12 which may result from changes in speed of the motor which is operating the vehicle or conveyance wherein the entire assemblage is installed.

The third unit forming a part of the complete assemblage is the alternator unit which will now be described in detail and which is driven by the shaft 35 which, as previously explained, is driven from the idler shaft 24 through the double sheave 31, belts 32 and 33 and double sheave 34 fast on the inner end of the intermediate shaft 35. The intermediate shaft 35 and the alternator mechanism associated therewith is housed within an auxiliary housing portion 10′ which also includes an end plate or wall 38 in which there is a bearing 39 which cooperates with the bearing 36 for journaling the intermediate shaft 35.

The preferred form of alternator used in the assemblage is shown in Figs. 1 and 3 and is of the type which utilizes a permanent magnet and may be used for all normal loads. It may be arranged for single or three-phase connection and for any standard voltage. The rotor 58 is, of course, fast on the intermediate shaft 35 within the casing extension 10′. The load winding is carried by the stator 59 and is excited by the rotating permanent magnet 58. The magnetic structure of the field assembly prevents demagnetization of the rotor magnet 58. This is accomplished by the location of a pole shoe 60 (see Fig. 3) at each end of the magnet. Said pole shoes extend around the circumference of the magnet to form a shunt magnetic path around the magnet with a small air gap 61 therebetween. This gap is so proportioned as to provide a shunt path for the magnetic flux when the field rotor is removed from the stator assembly and prevents demagnetizing the magnet. The faces of the pole shoes 60 incorporate a series of cast-in aluminum shorted turns 62 which create a counter-flux to counteract the demagnetizing flux created by the load current as well as serving as a mechanical means for holding the rotor together.

Figure 5:
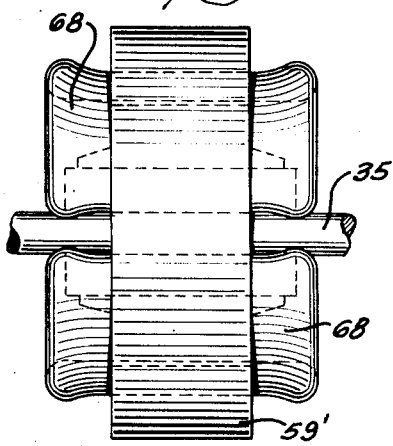
Fig. 5 is a side view of the alternative form of alternator unit shown in Fig. 4.

In lieu of the form of alternator shown in Fig. 3 an alternator of the type shown in Figs. 4 and 5 may be used if desired which is a wound rotor and is best suited for use where heavy motor starting loads are required. The form of alternator shown in Fig. 4 is of the general type classified as an over-excited saturated stationary armature excitation unit. This particular type of alternator is designed so as to eliminate the need for power handling slip rings and a direct current commutator. The power windings 68 are located on the stator 59′ and the field windings 69 are located on the rotor 58′.

Figure 6:
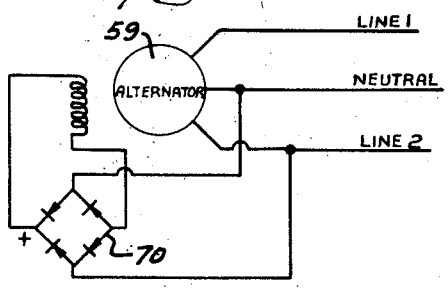
Fig. 6 is a wiring diagram for the form of alternator unit shown in Figs. 4 and 5 when a bridge rectifier connection is utilized.
Figure 7:
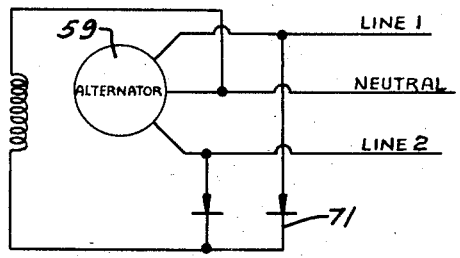
Fig. 7 is a wiring diagram for the form of alternator unit shown in Figs. 4 and 5 when a centertap rectifier connection is used.

In connection with the type of wound rotor alternator shown in Fig. 4, the rotor is constructed of a magnetized steel of sufficient retaining ability to supply the initial excitation upon the starting. The running excitation is supplied by a bridge rectifier 70 or a centertap rectifier 71 of silicon, selenium or germanium composition which rectifies the output voltage for field excitation. For normal motor loads the excitation is supplied directly from the alternator output as shown in the wiring diagrams, Figs. 6 and 7. Fig. 6 shows the arrangement where there is a bridge rectifier 70 connection and Fig. 7 shows the arrangement where there is a centertap rectifier 71 connection.

Figure 8:
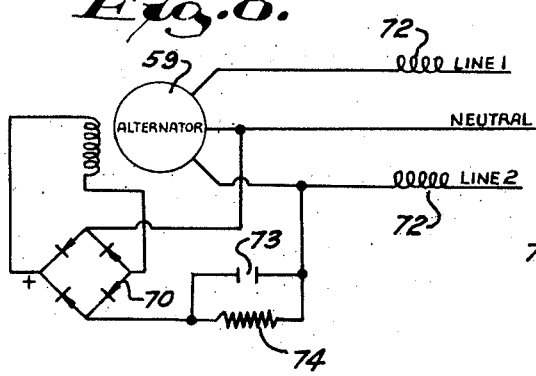
Fig. 8 is a wiring diagram of the alternator unit circuit wherein the excitation circuit is modified to include a current relay whch will cut a resistor out of the circuit to increase the field current for motor starting and high loads.
Figure 9:
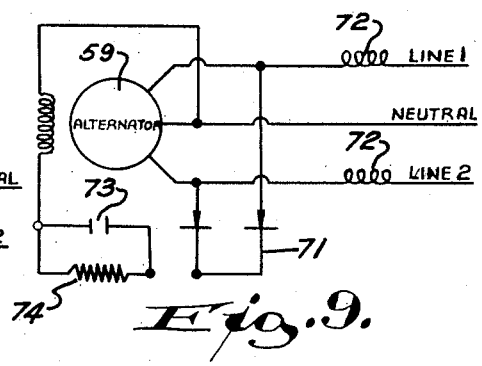
Fig. 9 is a form of circuit for a wound rotor alternator similar to that shown in Fig. 8 except that it includes a centertap rectifier instead of a bridge type rectifier.

For heavy motor loads the excitation circuit can be modified to include a current relay including an operating coil 72 and a normally open contact 73 which will cut a resistor 74 out of the circuit to increase the field current for motor starting under high loads. Alternative wiring diagrams for this arrangement are shown in Figs. 8 and 9. The excitation circuit is supplied to the rotating field through a contact button and pickup (not shown) which may be located on the end of the rotor shaft 35 which may be enclosed to prevent difficulty from atmospheric conditions. The casing extension 10′ shown in Fig. 1 is additionally provided with a fan housing 63 and silicon rectifiers (not shown) may be located on the inner face of a portion of this fan housing 63.

As the entire alternator apparatus may be mounted adjacent an engine or other generator of heat, it is desirable that means be provided for effectively cooling the internal operating elements of the assemblage. This is accomplished by an air inlet housing 64 (see Fig. 1) mounted on an external wall portion of the main housing 10. Connected with this air inlet housing may be a conduit (not shown) leading to a source of cool air and through the air inlet housing 64 cool air is directed into the interior of the housing and first flows through that portion of the housing which contains the variable sheaves. The frame wall 37 contains a large opening 65 and the air may then circulate through the extension portion 10′ of the housing so as to cool the alternator. The outer end portion of the intermediate shaft 35 carries within the fan housing 63 a driven fan 66 which serves to exhaust the air through openings 67 in the fan housing 63.

When the improved alternator assemblage is installed in a motor-driven vehicle, conveyance or installation it is unitary and compact and current carrying wires from the alternator unit may be extended to electrical equipment or appliances within the vehicle, conveyance or prime-mover operated installation or apparatus which should be supplied with a constant voltage and frequency alternating current. Regardless of the speed of operation of the input shaft 12 of the assemblage, within practical operating ranges, which is driven from the motor of the vehicle or the like and at varying speeds, the speed of rotation of the alternator or intermediate shaft 35 will remain constant because the hydraulic pump assemblage constantly varies the pitch diameter of the driver sheave to regulate and adjust the speed of rotation of the idler shaft 24. The governor members 51, being driven by the idler shaft 24, react to variations in the speed of shaft 24 and modulate the action of the hydraulic pump so as to force oil under pressure or exhaust oil from adjacent the piston 16 which axially moves the driver sheave plate 14 to maintain approximate constancy in the speed of shaft 35.

The alternator unit is devoid of brushes and such electrical members as might deteriorate under the influence of sea water or other outside conditions, thereby rendering the alternator apparatus especially suited for installation on motor boats for operating electrical appliances therein. The entire assemblage is also thoroughly air-cooled.

From the foregoing description it will be seen that the improved constant frequency variable input speed alternator apparatus includes a connecting and co-acting variable speed sheave unit, an hydraulic pump and servo control unit, and a rotating field alternator, all within a unitary compact casing or housing which will afford access to the various units. The improved alternator apparatus functions automatically and efficiently and is well adapted for the purposes described.

What is claimed as the invention is:

1. In an alternator apparatus having a variable speed driver shaft connected to a prime mover, an alternator, a shaft on which the alternator is mounted to be driven at a constant speed, an idler shaft, and means drivingly connecting the idler shaft with the constant speed alternator shaft, the improvements which comprise an hydraulically controlled, variable speed power transmission interposed between the variable speed driver shaft and the idler shaft, including an hydraulic pump driven by the idler shaft and having fluid pressure means extending to the variable speed transmission, and a governor control member connected to and driven by the idler shaft to modulate the output of the hydraulic pump for control of the variable speed power transmission.

2. In an alternator apparatus having a variable speed driver shaft, a permanent magnet-excited alternator, a shaft on which the alternator is mounted to be driven at a constant speed, an idler shaft, and motion transmitting means connecting the idler shaft with the constant speed alternator shaft, the improvements which comprise a variable speed power transmission interposed between the variable speed driver shaft and the idler shaft, including an hydraulic pump mechanism driven by the idler shaft and extending to the variable speed transmission to regulate the speed of operation thereof, and a governor control member connected to and driven by the idler shaft and modulating the output of the hydraulic pump in relation to the speed of operation of the idler shaft.

3. In an alternator apparatus having a variable speed driver shaft, an alternator, a shaft on which the alternator is mounted to be driven at a constant speed, an idler shaft, and means drivingly connecting the idler shaft with the constant speed alternator shaft, the improvements which comprise a variable speed power transmission interposed between the variable speed driver shaft and the idler shaft wherein said transmission includes belt-connected variable pitch sheaves, an hydraulic pump mechanism driven by the idler shaft and extending to the variable speed transmission to vary the sheave pitch, and a governor control member connected to and driven by the idler shaft and modulating the output of the hydraulic pump to thereby control the variable speed power transmission.

4. An hydraulic power transmission control for an assemblage which includes a variable speed driver shaft, an alternator, a shaft on which the alternator is mounted to be driven at a constant speed, an idler shaft, means drivingly connecting the idler shaft with the constant speed alternator shaft, and a variable speed power transmission interposed between the driver shaft and the idler shaft, said transmission including belt-connected variable pitch sheaves each of which has axially shiftable sheave sides; comprising an hydraulic ram for moving the shiftable side of one of the sheaves, an hydraulic pump driven by the idler shaft and operatively associated with said hydraulic ram whereby said sheave side is shifted to vary the sheave pitch, and a governor control member driven by the idler shaft and modulating the output of the hydraulic pump.

5. A variable speed power transmission for interposition between a variable speed driven shaft and an idler shaft, comprising belt-connected variable pitch sheaves, an hydraulically operated piston for controlling one of the variable pitch sheaves, and an hydraulic governor and servo control member driven by the idler shaft and extending to said piston.

6. In an alternator apparatus having a variable speed driver shaft, an alternator, a shaft on which the alternator is mounted to be driven at a constant speed, an idler shaft, and means drivingly connecting the idler shaft with the constant speed alternator shaft, the improvements which comprise a variable speed power transmission interposed between the variable speed driver shaft and the idler shaft, an hydraulic governor and servo control member driven by the idler shaft and extending to and controlling the variable speed transmission, and a unitary casing enclosing all of the shafts, the alternator, the variable speed power transmission and the governor and servo control member, said casing having an air inlet and an air outlet, and a fan mounted on and driven by the alternator shaft.

7. In a constant voltage and frequency alternating current output assemblage including a constant speed shaft, an alternator unit mounted thereon, a variable speed driver shaft, a variable speed driver sheave mounted on and driven by the driver shaft, said driver sheave including a pair of relatively movable sheave plates, the improvements which comprise hydraulic piston means connected with one of said driver sheave plates for moving it relative to the other sheave plate to vary the pitch diameter of the driver sheave, an idler shaft, a driven variable speed sheave mounted on said idler shaft, said driven sheave including a pair of relatively movable sheave plates, a belt drivingly connecting the driver and driven sheaves, means for transmitting rotative power from the idler shaft to the alternator shaft, an hydraulic pump for furnishing fluid under pressure to said piston means to axially move one of the plates of the driver sheave to vary its pitch diameter, said hydraulic pump being associated with and driven by the idler shaft, and a governor device carried by the idler shaft to modulate the action of the hydraulic pump relative to the hydraulic piston.

8. Hydraulically operated means for controlling a variable speed power transmission interposed between a variable speed shaft and an idler shaft, comprising a servo control member extending to said hydraulically operated means, an eccentric on said idler shaft engaging and operating said servo control member, and a governor carried and operated by the idler shaft to modulate the action of the servo control member.

9. In a constant voltage and frequency alternating current output assemblage having a constant speed shaft, an alternator unit mounted thereon, a variable speed driver shaft, an hydraulically operated variable speed driver sheave mounted on and driven by the driver shaft, fluid pressure means extending to said variable speed driven sheave to vary the pitch diameter, a driven variable speed sheave mounted on said idler shaft, and a belt drivingly connecting the driver and driven sheaves, the improvements which comprise means for transmitting rotative power from the idler shaft to the alternator shaft, an hydraulic pump for furnishing fluid under pressure to said driver sheave, an eccentric driven by the idler shaft and engaging the hydraulic pump to operate it, and a governor device carried by the idler shaft to modulate the action of the hydraulic pump in relation to the speed of operation of the idler shaft.

10. In a constant voltage and frequency alternating current output assemblage having a constant speed shaft, an alternator unit mounted thereon, a variable speed driver shaft, an hydraulically operated variable speed driver sheave mounted on and driven by the driver shaft, fluid pressure means including conduits extending to said variable speed driven sheave to vary the pitch diameter, a driven variable speed sheave mounted on said idler shaft, and a belt drivingly connecting the driver and driven sheaves, the improvements which comprise means for transmitting rotative power from the idler shaft to the alternator shaft, an hydraulic pump for furnishing fluid under pressure to said driver sheave through said conduits, an eccentric driven by the idler shaft and engaging the hydraulic pump to operate it, a valve controlling fluid flow through said conduits, and a governor device carried by the idler shaft to modulate the action of the hydraulic pump in relation to the speed of operation of the idler shaft and to operate said valve.

References Cited in the file of this patent

UNITED STATES PATENTS

| | | |
|---|---|---|
| 2,477,991 | Lamm | Aug. 2, 1949 |
| 2,518,129 | Eichorn | Aug. 8, 1950 |
| 2,525,451 | Graves | Oct. 10, 1950 |
| 2,660,069 | Horne et al. | Nov. 24, 1953 |
| 2,779,203 | Eubanks | Jan. 29, 1957 |